United States Patent

[11] 3,578,357

| [72] | Inventors | Clarence N. Bouman<br>Holland;<br>Fred Bakker, West Olive, Mich. |
|---|---|---|
| [21] | Appl. No. | 787,482 |
| [22] | Filed | Dec. 27, 1968 |
| [45] | Patented | May 11, 1971 |
| [73] | Assignee | Holland Hitch Company<br>Holland, Mich. |

[54] FIFTH WHEEL LOCK ASSEMBLY
2 Claims, 6 Drawing Figs.

| [52] | U.S. Cl. | 280/434 |
|---|---|---|
| [51] | Int. Cl. | B62d 53/12 |
| [50] | Field of Search | 280/433–435, 438 |

[56] References Cited
UNITED STATES PATENTS

| 2,102,821 | 12/1937 | Seyferth | 280/434 |
|---|---|---|---|
| 3,165,335 | 1/1965 | Methren | 280/421 |
| 3,239,240 | 3/1966 | Palmer | 280/434 |
| 3,392,992 | 7/1968 | Baker et al. | 280/435X |

FOREIGN PATENTS

| 111,071 | 7/1940 | Australia | 280/433 |
|---|---|---|---|

Primary Examiner—Leo Friaglia
Attorney—Price, Heneveld, Huizenga & Cooper

ABSTRACT: A kingpin lock assembly for a vehicular-hauling hitch, especially the fifth-wheel type, using overlapping retention jaws giving full peripheral pin engagement, the jaws sliding laterally together in retention tracks generally transverse to the usual direction of the hauling force.

Patented May 11, 1971

INVENTORS
CLARENCE N. BOUMAN
FRED BAKKER
BY
*Price, Heneveld*
*Huizenga & Cooper*
ATTORNEYS

INVENTORS
CLARENCE N. BOUMAN
FRED BAKKER
BY
ATTORNEYS

FIFTH WHEEL LOCK ASSEMBLY

BACKGROUND OF THE INVENTION

This invention relates to vehicular-hauling hitches, and more particularly to the kingpin lock assembly therefor, particularly for fifth-wheel units.

Conventional fifth-wheel units employ a pair of pivotal jaws which swing around behind the interconnectable kingpin on a trailer. These jaws are secured in place around the kingpin as by a yoke member which clamps over the jaws to engage their cam surfaces and prevent reopening thereof. This general type of structure is illustrated in U.S. Pat. No. 3,013,815 for example. When the yoke is not in place, the kingpin will pull free of the jaws since they will pivot open to release it. Although this prior art apparatus provides excellent strength and safety for large heavy semitrailer loads normally towed by heavy-duty tractors, it is rather complex and costly.

Sometimes, especially in recent years, it has been desirable to tow trailers of lesser size and weight, e.g. camper trailers and the like, with smaller fifth-wheel hitches or the equivalent with a small towing vehicle such as a pickup truck, rather than using the usual ball-type hitch or the like. Such a hitch would be more sturdy and safer. However, for practical reasons, it really cannot be as complex and costly as normal semitruck fifth-wheel units.

SUMMARY OF THE INVENTION

It therefore is an object of this invention to provide a novel kingpin lock assembly which is potentially useful for fifth-wheels of all sizes, but is particularly suited for small fifth-wheel hitch units of the type to be mounted on pickup size vehicles for hauling intermediate type loads such as camper trailers, horse or other stock trailers, and the like.

The novel kingpin lock assembly employs jaws which do not require a camming yoke or the like to keep them securely engaged with the kingpin. The jaws mutually engage in overlapping relationship behind the kingpin, such that they themselves securely retain the kingpin. The jaws slide together laterally from opposite sides, transverse to the usual hauling direction, being biased to the closed interengaged relation, and being openable by the camming action of an entering kingpin or with an operating linkage connected to the jaws.

The structure effects secure retention of the kingpin for hauling, yet is relatively simple and easy to operate, enabling rapid release of the kingpin when desired.

These and other objects, advantages, and features of the invention will become apparent from the detailed description and the drawings.

DESCRIPTION OF THE PREFERRED EMBODIMENT

Figure 1:
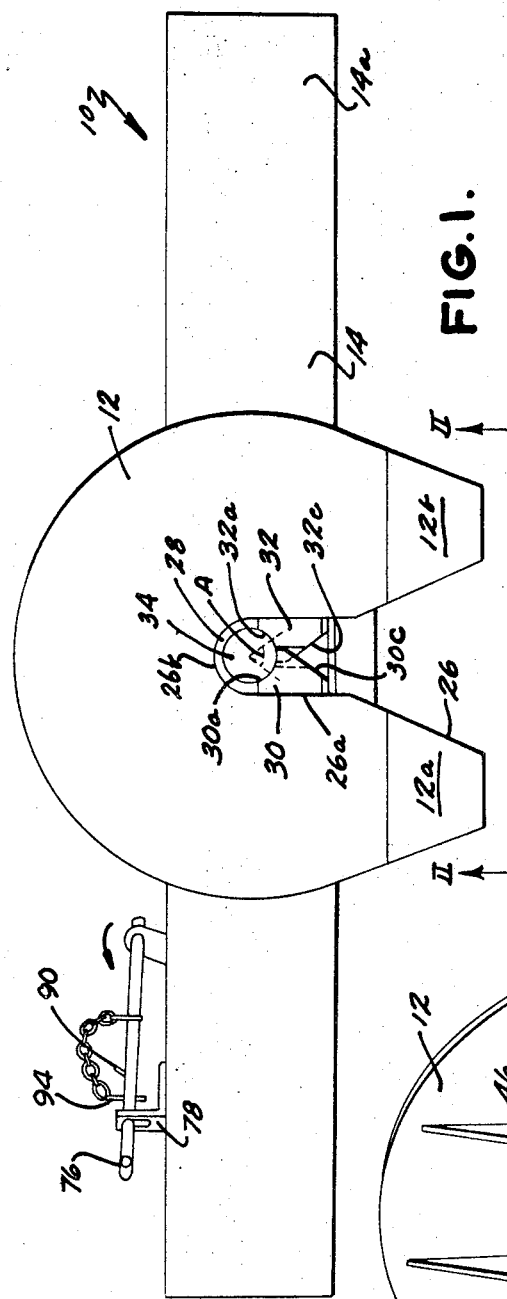
FIG. 1 is a plan view of a vehicular fifth-wheel-type hauling hitch assembly employing the novel apparatus.
Figure 3:
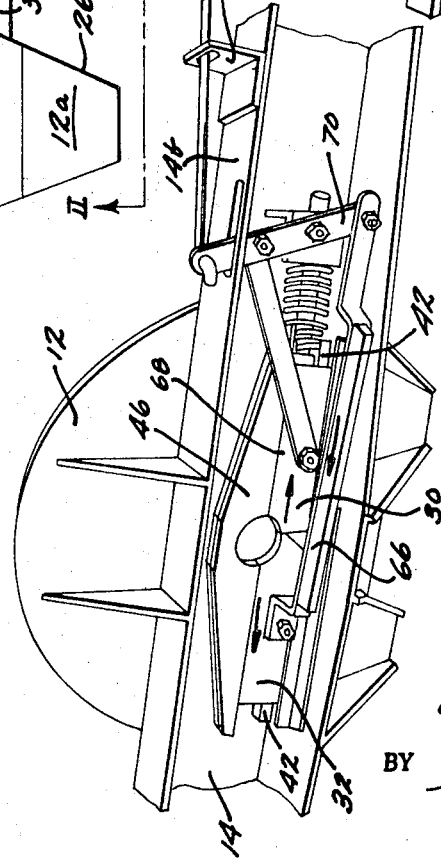
FIG. 3 is a fragmentary perspective view of the under side of the apparatus in FIG. 1, shown with the hitch in a closed, kingpin retention condition.
Figure 4:
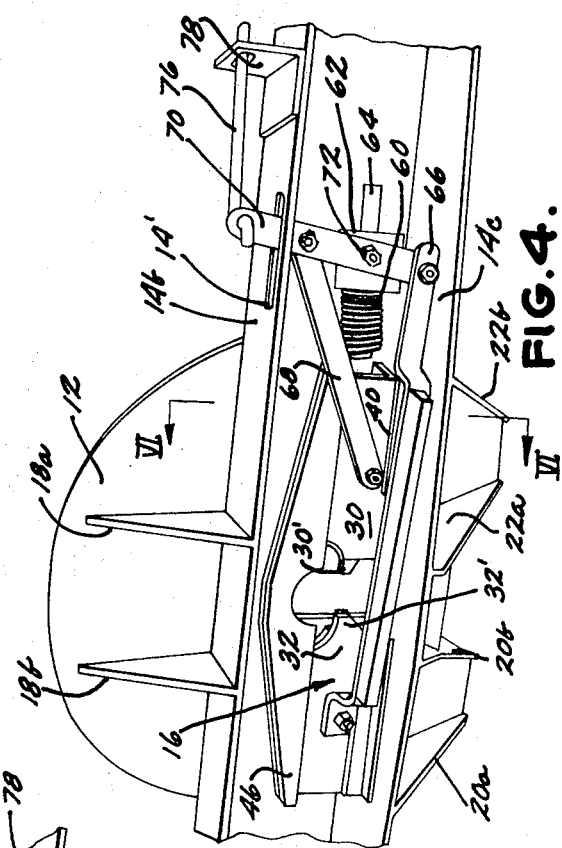
FIG. 4 is a fragmentary perspective view of the apparatus in FIG. 3, shown with the hitch in the kingpin releasing condition.
Figure 5:
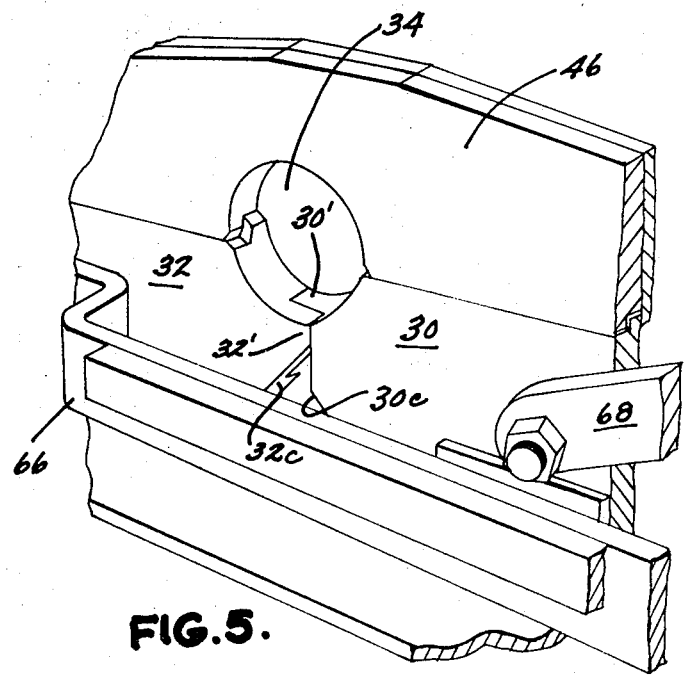
FIG. 5 is a fragmentary enlarged perspective view of the central portion of the apparatus in FIG. 3.

The vehicular fifth-wheel-type hauling hitch unit 10 is shown to include a transverse support 14, with a fifth-wheel plate 12 mounted on the upper side thereof, and a kingpin-locking jaw assembly 16 mounted on the lower side thereof.

Support 14 may take any of several different configurations, its function being primarily to mount the entire unit to a vehicle, as to the bed of a pickup truck or the like. In the particular form of the invention illustrated, support 14 constitutes an elongated, inverted channel-shaped member having a central plate 14a and a pair of depending flanges 14b and 14c. It is shown to extend laterally of the vehicle, i.e. transverse to the direction of hauling. Fifth-wheel plate 12 is mounted to support 14 as by welding. Preferably, a pair of upstanding bracing platelets 18a and 18b are secured to flange 14b and to the rear under side of the fifth-wheel plate, and two pairs of similar platelets 20a and 20b, and 22a and 22b, are secured between the frontal flange 14c and the under side of the respective frontal segments 12a and 12b of the bifurcated front portion of the fifth-wheel plate. Typically, portions 12a and 12b are sloped upwardly to the rear, converging with the plane of the main portion of plate 12, for easy connection to the hitch member on the vehicle to be hauled.

Fifth-wheel plate 12 has a slot extending rearwardly from the frontal edge thereof, including an inwardly convergently tapered forward portion 26, an intermediate portion 26a that has generally parallel sidewalls, and a semicircular inner end portion 26b generally centrally of the fifth-wheel. Support 14 also has a slot generally coincident with portions 26a and 26b. Preferably, portion 26b has a bearing sleeve member 28 which is generally semicircular in cross section, but elongated to be generally semicylindrical vertically, for engaging the cylindrical kingpin.

This forward semicircular portion cooperates with a special pair of sliding jaw members 30 and 32 which are specially adapted to mutually interengage to form a cooperative semicircular position. Arcuate surfaces 30a and 32a cooperate to complete the circular cross section kingpin receiving opening 34. The inner end portions of jaws 30 and 32 forming the arcuate surfaces 30a and 32a actually extend beyond the 90° arcuate surfaces, with the extending tongue portions 30' and 32' being vertically offset in opposite relationship to cause the jaws to overlap and extend beyond the front to aft centerline of the circular kingpin-receiving opening 34. This offset relationship can be seen particularly in FIGS. 1, 2, 4, and 5. That is, the inner end tongue 32' of the elongated, platelike jaw 32 has a partial thickness of the remainder of the jaw, as does the inner end 30' of the elongated platelike jaw 30, such that the two overlapping portions create a common kingpin-engaging surface that constitutes a "cylindrical surface." This "cylindrical surface" is a segment of the "closed cylindrical surface" formed by both cooperative jaws and having the circular cross section. The angle A (FIG. 1) of this cooperatively formed "cylindrical surface" is about 30—40°, to thereby cause the hauling force to still be shared even when the hauled vehicle is at a reasonable angle to the hauling vehicle, as when turning.

Figure 6:
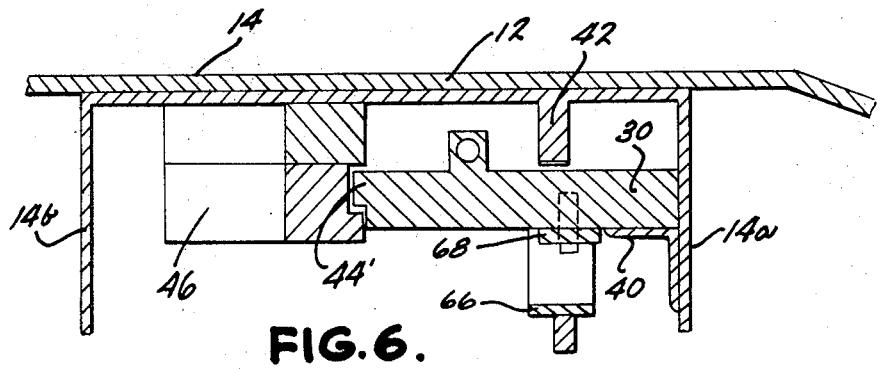
FIG. 6 is a fragmentary enlarged sectional view taken on plane VI—VI of FIG. 4.
Figure 2:
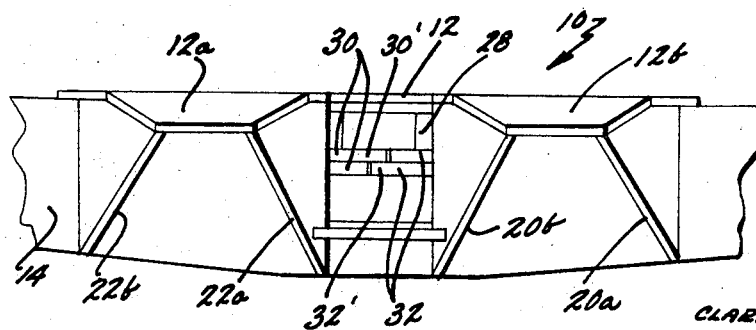
FIG. 2 is an elevational view of the main central portion of the apparatus in FIG. 1, viewed in the direction II—II of FIG. 1.

Jaws 30 and 32 are mounted to be slidably movable rectilinearly toward and away from each other in a direction transverse to the front to aft centerline, i.e. generally transverse to the normal direction of the hauling force, the jaws therefore open up to close off the rear 180° arcuate portion of the opening 34. Jaws 30 and 32 are retained in slide tracks formed by suitable guide and retention means. Specifically, as shown in FIG. 6, the jaws are retained in position by an L-shaped bracket 40 and an elongated abutment surface 42 generally along the rear edge portion (with respect to the hauling direction), and may include an elongated tongue 44 fitting within a slot of fixed guide track 46 along the frontal edge portion. The inner edges of jaws 30 and 32, on the rear portion thereof, are forwardly and inwardly diagonally divergently tapered to form tapered camming surfaces 30c and 32c to be engaged by an entering kingpin and thereby allow lateral spreading of the jaws as they are shifted apart with entry of the kingpin from the rear into receiving opening 34.

Normally, the jaws are biased into engagement with each other by a suitable biasing means such as the coil compression spring 60. In the illustrated form of the apparatus, this spring extends between a fixed block 62 secured to the underside of support 14 and one of the jaws, e.g. jaw 30, the spring being retained on a rod 64. This biasing action affects both jaws because of the linkage to be described.

More specifically, an elongated link 66 is pivotally attached at one of its ends to jaw 32. A second link 68 is pivotally attached at one of its ends to jaw 30. The opposite ends of these two pivotal links 66 and 68 are pivotally linked to a lever 70 on opposite sides of a pivotal mounting 72 of lever 70 to block 62. One end of this lever 70 extends beyond flange 14b, as through a slot 14' (FIG. 4) where it is connected to an operating handle 76. This handle extends through an elongated slot in a guide 78 attached to flange 14b. Manual pulling of the handle in the direction away from the fifth-wheel (FIG. 1) causes pivoting of lever 70, which in turn pulls link 68 to slide jaws 30 toward link 70, and pushes link 66 to slide jaw 32 in the opposite direction, i.e. away from link 70. Thus the jaws are slid apart to open the mechanism for release of a kingpin. Yet, hauling force creating rearward thrust of the kingpin against the jaw members does not spread the jaws to release the kingpin. An additional safety pin 94 on a chain 95 or the like can be inserted through an opening in handle 76 adjacent guide 78 to prevent inadvertent opening of the hitch. When the jaws are manually opened using handle 76, they may be temporarily retained in an open position against the bias of spring 60 by shifting the handle 76 slightly transversely in the elongated slot of guide 78 to hook pin 90 on guide 78 (FIG. 1). Opening of the jaws (FIG. 4) is against the bias of spring 60 since, although spring 60 only engages jaw 30, the two jaws are interconnected through links 66 and 68 and lever 70 so that the bias is applied to both jaws simultaneously.

The operation of the apparatus, although apparent from the above description, will be briefly described to assure complete understanding of the unit.

When a trailer such as a camping trailer, mobile home, horse trailer, or the like is to be connected to the hauling hitch structure in FIG. 1, the vehicle upon which this hitch is mounted is backed beneath the kingpin unit mounted on the trailer so that the bifurcated fifth-wheel, and specifically portions 12a and 12b move back astraddle of the kingpin until the kingpin engages the diagonal camming surfaces 30c and 32c of jaws 30 and 32. Further rearward movement of the vehicle causes the kingpin to cam jaws 30 and 32 apart against the bias of spring 60, the driver having removed safety pin 94 so that the linkage can shift with the jaws. When the kingpin has entered circular receiving opening 34, the jaws are free to be snapped shut by the biasing spring, thereby trapping the kingpin against removal. Safety pin 94 is then replaced. The lock assembly thereby retains the kingpin rearward thrust by the kingpin against the overlapping jaws cannot cause rearward movement of the jaws since they are not free to move rearwardly. Further, the overlapping nature of the jaw end portions 32' and 30' prevent the jaws from being cammed apart. When it is desired to release the kingpin, pin 94 is withdrawn, and handle 76 is pulled manually until the jaws are spread sufficiently. The handle and jaws can be retained in this position by hooking the pin 90 on guide bracket 78 until the towing vehicle is advanced sufficiently to completely release the unit.

Various additional advantages and features of the apparatus may well occur to those in the art upon studying this specific disclosure. It is also possible that certain details of construction may be modified without departing from the concept presented. The device has been found to be particularly useful for small and intermediate size loads but could conceivably be employed for other size loads by appropriate use of the construction materials in the manufacture of the hitch assembly.

We claim:

1. A kingpin-locking assembly for a vehicular-hauling hitch, comprising: support means defining a generally semicircular frontal portion of a kingpin-receiving mechanism, jaws collectively defining a second semicircular portion, positioned to form the rear of said kingpin-receiving mechanism, said jaws being laterally rectilinearly shiftable from a spaced, kingpin releasing relationship, to an engaged kingpin retention relationship, said engaged jaws being retained against rearward movement so as to retain the kingpin from escape under hauling conditions; said jaws comprising a pair of members with arcuate surfaces of approximately 90° each, but each jaw having a tongue extending beyond such arcuate surfaces and overlapping when said jaws are engaged, to form an overlapping kingpin-engaging cylindrical surface area at the rear of the assembly.

2. A kingpin-locking assembly for a vehicular-hauling hitch comprising: support means defining a generally semicircular rearwardly opening frontal portion of a kingpin-receiving mechanism; a pair of slidable jaws; and slide track means retaining said jaws, oriented to enable lateral shifting of said jaws toward and into engagement with each other, and away from and out of engagement with each other; said jaws each having arcuate surfaces of approximately 90° on the inner ends thereof to cooperatively form a semicircular rear portion of the kingpin-receiving mechanism; each of said jaws having a tongue extending beyond its respective arcuate surface; and said tongues being in overlapping relationship when said jaws are engaged, with the angle between the overlap and the center of the kingpin-receiving circle being at least about 30°.